US012691689B2

(12) United States Patent
Motoyoshi

(10) Patent No.: US 12,691,689 B2
(45) Date of Patent: Jul. 28, 2026

(54) LIQUID JET HEAD, LIQUID JET RECORDING APPARATUS, AND METHOD OF CONTROLLING LIQUID JET HEAD

(71) Applicant: SII Printek Inc., Chiba (JP)

(72) Inventor: Masaya Motoyoshi, Chiba (JP)

(73) Assignee: SII PRINTEK INC., Chiba (JP)

( * ) Notice: Subject to any disclaimer, the term of this patent is extended or adjusted under 35 U.S.C. 154(b) by 154 days.

(21) Appl. No.: 18/887,774

(22) Filed: Sep. 17, 2024

(65) Prior Publication Data

US 2025/0091353 A1 Mar. 20, 2025

(30) Foreign Application Priority Data

Sep. 20, 2023 (JP) ................................ 2023-153881

(51) Int. Cl.
*B41J 2/175* (2006.01)
*B41J 2/045* (2006.01)

(52) U.S. Cl.
CPC ........... *B41J 2/175* (2013.01); *B41J 2/04501* (2013.01)

(58) Field of Classification Search
CPC .... B41J 2/175; B41J 2/04501; B41J 2/04581; B41J 2/04588; B41J 2/16526; B41J 2002/14362; B41J 2002/14491; B41J 2202/12; B41J 2/14209
See application file for complete search history.

(56) References Cited

U.S. PATENT DOCUMENTS

2002/0005874 A1 1/2002 Imai et al.
2011/0085012 A1* 4/2011 Nishikawa ........... B41J 2/14233 347/92

FOREIGN PATENT DOCUMENTS

EP 0788882 A2 * 8/1997 .......... B41J 2/04588
JP 2022-138554 A 9/2022

OTHER PUBLICATIONS

Suzuki et al., “Inkj-jet Recording Head” (EP 0788882 A2), Aug. 1, 19973, [Abstract and Description] (Year: 1997).*
Search Report in European Application No. 24197700.8, dated Jan. 31, 2025 (9 pages).

* cited by examiner

*Primary Examiner* — Lisa Solomon
(74) *Attorney, Agent, or Firm* — Crowell & Moring LLP

(57) ABSTRACT

There are provided a liquid jet head and so on capable of increasing the ejection reliability. A liquid jet head according to an embodiment of the present disclosure includes a jet unit including a plurality of nozzles, a plurality of pressure chambers which is individually communicated with the plurality of nozzles, and which is filled with the liquid, a liquid supply chamber configured to supply the liquid to insides of the pressure chambers, and a liquid recovery chamber configured to recover the liquid from the insides of the pressure chambers, and a drive unit configured to drive the jet unit based on a drive signal to jet the liquid which fills the inside of the pressure chamber from the nozzle. The drive unit drives the jet unit based on a first drive signal as the drive signal when performing a printing operation on a recording target medium so as to achieve ejection strength lower than meniscus breaking strength of breaking a meniscus in the jet unit, and drives the jet unit based on a second drive signal as the drive signal when performing a flushing operation as a non-printing operation of performing dummy ejection of the liquid from the nozzle so as to achieve the ejection strength higher than the meniscus breaking strength.

8 Claims, 14 Drawing Sheets

| METHOD OF REALIZING (Pj2>Pmb) IN FLUSHING OPERATION | |
|---|---|
| METHOD A | NUMBER OF PULSES INCLUDED IN Td: Np2>Nth (CORRESPONDING TO Pmb) |
| METHOD B | (Vd IN Sd2)=Vd2>Vth (CORRESPONDING TO Pmb) |
| METHOD C | (fd IN Sd2)=fd2>fth (CORRESPONDING TO Pmb) |
| METHOD D | PULSE WIDTH OF PULSE INCLUDED IN Sd2: Wp2=AP |

FIG.11

MODIFIED EXAMPLE

MODIFIED EXAMPLE

LIQUID JET HEAD, LIQUID JET RECORDING APPARATUS, AND METHOD OF CONTROLLING LIQUID JET HEAD

RELATED APPLICATIONS

This application claims priority to Japanese Patent application No. JP 2023-153881 filed on Sep. 20, 2023, the entire content of which is incorporated herein by reference.

BACKGROUND OF THE INVENTION

1. Field of the Invention

The present disclosure relates to a liquid jet head, a liquid jet recording apparatus, and a method of controlling a liquid jet head.

2. Description of the Related Art

Liquid jet recording apparatuses equipped with liquid jet heads are used in a variety of fields, and a variety of types of liquid jet heads have been developed (see, e.g., JP2022-138554A).

In such a liquid jet head, in general, it is required to improve the reliability (ejection reliability) when ejecting a liquid.

It is desirable to provide a liquid jet head, a liquid jet recording apparatus, and a method of controlling a liquid jet head capable of improving the ejection reliability.

SUMMARY OF THE INVENTION

A liquid jet head according to an embodiment of the present disclosure includes a jet unit including a plurality of nozzles configured to jet a liquid, a plurality of pressure chambers which is individually communicated with the plurality of nozzles, and which is filled with the liquid, a liquid supply chamber configured to supply the liquid to insides of the pressure chambers, and a liquid recovery chamber configured to recover the liquid from the insides of the pressure chambers, and a drive unit configured to drive the jet unit based on a drive signal to jet the liquid which fills the inside of the pressure chamber from the nozzle. The drive unit is configured to drive the jet unit based on a first drive signal as the drive signal when performing a printing operation on a recording target medium so as to achieve ejection strength lower than meniscus breaking strength of breaking a meniscus in the jet unit, and drive the jet unit based on a second drive signal as the drive signal when performing a flushing operation as a non-printing operation of performing dummy ejection of the liquid from the nozzle so as to achieve the ejection strength higher than the meniscus breaking strength. It should be noted that the "meniscus breaking strength" in the present disclosure means the ejection strength in which the meniscus in the jet unit is broken, and bubbles are drawn from the nozzle into the jet unit to thereby form a gas-liquid two-phase flow formed of the liquid supplied by being circulated between the liquid jet head and the outside and the bubble. Further, the "ejection strength" in the present disclosure means "an amount of energy to be applied to the jet unit (an actuator)."

A liquid jet recording apparatus according to an embodiment of the present disclosure includes the liquid jet head according to the embodiment of the present disclosure.

A method of controlling a liquid jet head according to the present disclosure is a method of controlling a liquid jet head provided with a jet unit including a plurality of nozzles configured to jet a liquid, a plurality of pressure chambers which is individually communicated with the plurality of nozzles, and which is filled with the liquid, a liquid supply chamber configured to supply the liquid to insides of the pressure chambers, and a liquid recovery chamber configured to recover the liquid from the insides of the pressure chambers, the method including driving the jet unit based on a drive signal to jet the liquid which fills the inside of the pressure chamber from the nozzle. The jetting the liquid from the nozzle includes driving the jet unit based on a first drive signal as the drive signal when performing a printing operation on a recording target medium so as to achieve ejection strength lower than meniscus breaking strength of breaking a meniscus in the jet unit, and driving the jet unit based on a second drive signal as the drive signal when performing a flushing operation as a non-printing operation of performing dummy ejection of the liquid from the nozzle so as to achieve the ejection strength higher than the meniscus breaking strength.

According to the liquid jet head, the liquid jet recording apparatus, and the method of controlling a liquid jet head related to an embodiment of the present disclosure, it becomes possible to increase the ejection reliability.

BRIEF DESCRIPTION OF THE DRAWINGS

FIG. 11 is a diagram showing a variety of method examples when performing the flushing operation.

DETAILED DESCRIPTION OF THE PREFERRED EMBODIMENTS

An embodiment of the present disclosure will hereinafter be described in detail with reference to the drawings. It should be noted that the description will be presented in the following order.

1. Embodiment (an example of a method of achieving ejection strength higher than meniscus breaking strength when performing a flushing operation).

2. Modified Example (an example of when providing a bypass channel for communicating a liquid supply chamber and a liquid recovery chamber with each other).

3. Other Modified Examples.

First Embodiment (A. Overall Configuration of Printer 1)

Figure 1:
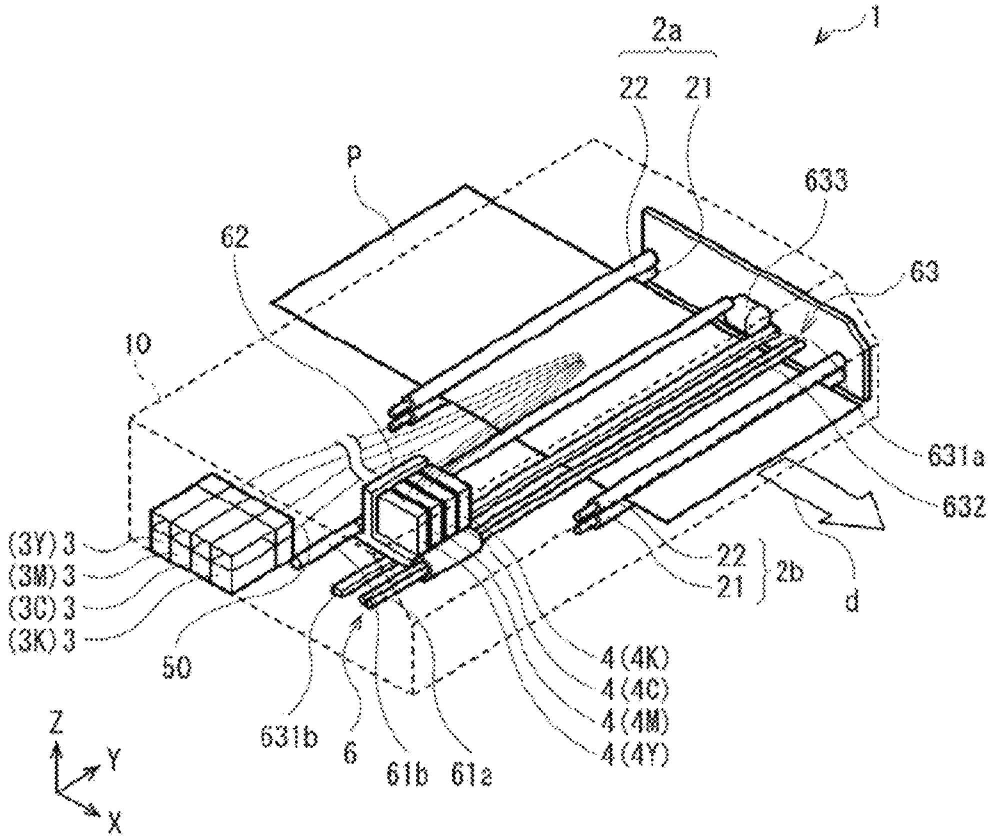
FIG. 1 is a schematic perspective view showing a schematic configuration example of a liquid jet recording apparatus according to an embodiment of the present disclosure.

FIG. 1 is a perspective view schematically showing a schematic configuration example of a printer 1 as a liquid jet recording apparatus according to an embodiment of the present disclosure. The printer 1 is an inkjet printer for performing recording (printing) of images, characters, and the like on recording paper P as a recording target medium using ink 9 described later. It should be noted that the recording target medium is not limited to paper, but includes a material on which recording can be performed such as ceramic or glass.

As shown in FIG. 1, the printer 1 is provided with a pair of conveying mechanisms 2*a*, 2*b*, ink tanks 3, inkjet heads 4, ink supply tubes 50, and a scanning mechanism 6. These members are housed in a chassis 10 having a predetermined shape. In the present embodiment, the description will be present citing a circulation type inkjet head using the ink 9 circulating the ink 9 between the ink tanks 3 and the inkjet heads 4 as an example although described later in detail. It should be noted that a scale size of each of the members is accordingly altered so that the member is shown in a recognizable size in the drawings used in the description of the present specification. Further, in the present embodiment, a method of controlling the inkjet heads 4 will hereinafter be described in combination.

Here, the printer 1 corresponds to a specific example of the "liquid jet recording device" in the present disclosure, and the inkjet heads 4 (the inkjet heads 4Y, 4M, 4C, and 4K described later) each correspond to a specific example of a "liquid jet head" in the present disclosure. Further, the ink 9 corresponds to a specific example of a "liquid" in the present disclosure.

As shown in FIG. 1, the conveying mechanisms 2*a*, 2*b* are each a mechanism for conveying the recording paper P along a conveyance direction d (an X-axis direction). These conveying mechanisms 2*a*, 2*b* each have a grid roller 21, a pinch roller 22, and a drive mechanism (not shown). This drive mechanism is a mechanism for rotating (rotating in a Z-X plane) the grid roller 21 around an axis, and is constituted by, for example, a motor.

(Ink Tanks 3)

The ink tanks 3 are tanks for containing the ink 9 inside. As the ink tanks 3, there are disposed four types of tanks which individually contain the ink 9 of four colors of yellow (Y), magenta (M), cyan (C), and black (K) in this example as shown in FIG. 1. Specifically, there are disposed the ink tank 3Y for containing the ink 9 having a yellow color, the ink tank 3M for containing the ink 9 having a magenta color, the ink tank 3C for containing the ink 9 having a cyan color, and the ink tank 3K for containing the ink 9 having a black color. These ink tanks 3Y, 3M, 3C, and 3K are arranged side by side along the X-axis direction inside the chassis 10.

It should be noted that the ink tanks 3Y, 3M, 3C, and 3K have the same configuration except the color of the ink 9 contained, and are therefore collectively referred to as ink tanks 3 in the following description.

(Inkjet Heads 4)

The inkjet heads 4 are each a head for jetting (ejecting) the ink 9 shaped like a droplet from a plurality of nozzles (nozzle holes Hn) described later to the recording paper P to thereby perform recording (printing) of images, characters, and so on. As the inkjet heads 4, there are also provided four types of heads for individually jetting the four colors of ink 9 respectively contained in the ink tanks 3Y, 3M, 3C, and 3K described above in this example as shown in FIG. 1. Specifically, there are disposed the inkjet head 4Y for jetting the ink 9 having the yellow color, the inkjet head 4M for jetting the ink 9 having the magenta color, the inkjet head 4C for jetting the ink 9 having the cyan color, and the inkjet head 4K for jetting the ink 9 having the black color. These inkjet heads 4Y, 4M, 4C and 4K are arranged side by side along the Y-axis direction inside the chassis 10.

It should be noted that the inkjet heads 4Y, 4M, 4C and 4K have the same configuration except the color of the ink 9 used therein, and are therefore collectively referred to as inkjet heads 4 in the following description. Further, the detailed configuration example of the inkjet heads 4 will be described later (FIG. 2 to FIG. 7).

The ink supply tubes 50 are each a tube through which the ink 9 is supplied from the inside of the ink tank 3 toward the inside of the inkjet head 4. The ink supply tubes 50 are each formed of, for example, a flexible hose having such flexibility as to be able to follow the action of a scanning mechanism 6 described below.

(Scanning Mechanism 6)

The scanning mechanism 6 is a mechanism for making the inkjet heads 4 perform a scanning operation along the width direction of the recording paper P (the Y-axis direction). As shown in FIG. 1, the scanning mechanism 6 has a pair of guide rails 61*a*, 61*b* disposed so as to extend along the Y-axis direction, a carriage 62 movably supported by these guide rails 61*a*, 61*b*, and a drive mechanism 63 for moving the carriage 62 along the Y-axis direction.

The drive mechanism 63 has a pair of pulleys 631*a*, 631*b* disposed between the guide rails 61*a*, 61*b*, an endless belt 632 wound between these pulleys 631*a*, 631*b*, and a drive motor 633 for rotationally driving the pulley 631*a*. Further, on the carriage 62, there are arranged the four types of inkjet heads 4Y, 4M, 4C and 4K described above side by side along the Y-axis direction.

It should be noted that it is arranged that such a scanning mechanism 6 and the conveying mechanisms 2*a*, 2*b* described above constitute a moving mechanism for moving the inkjet heads 4 and the recording paper P relatively to each other. It should be noted that the moving mechanism of such a method is not a limitation, and it is also possible to adopt, for example, a method (a so-called "single-pass method") of moving only the recording target medium (the recording paper P) while fixing the inkjet heads 4 to thereby move the inkjet heads 4 and the recording target medium relatively to each other.

(B. Detailed Configuration of Inkjet Heads 4)

Then, a detailed configuration example of the inkjet head 4 will be described with reference to FIG. 2 through FIG. 7.

Figure 2:
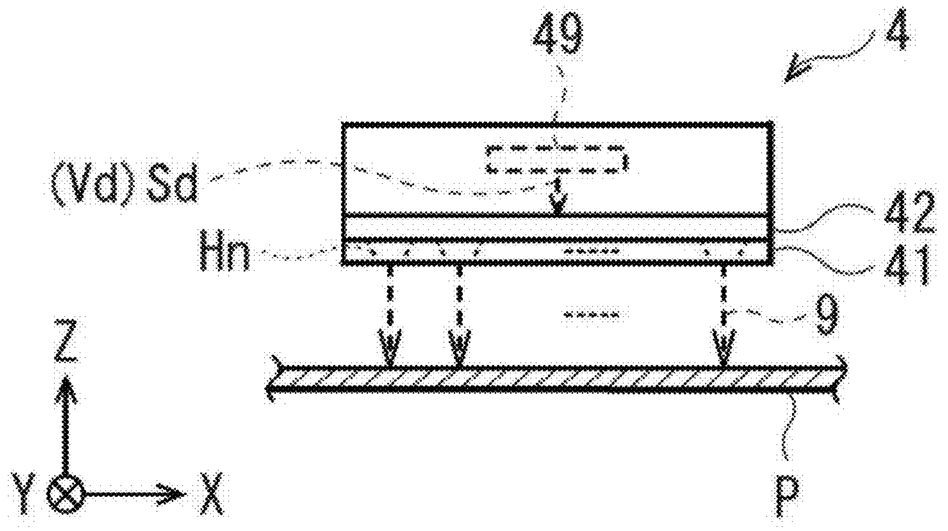
FIG. 2 is a schematic diagram showing a schematic configuration example of a liquid jet head shown in FIG. 1.
Figure 3:
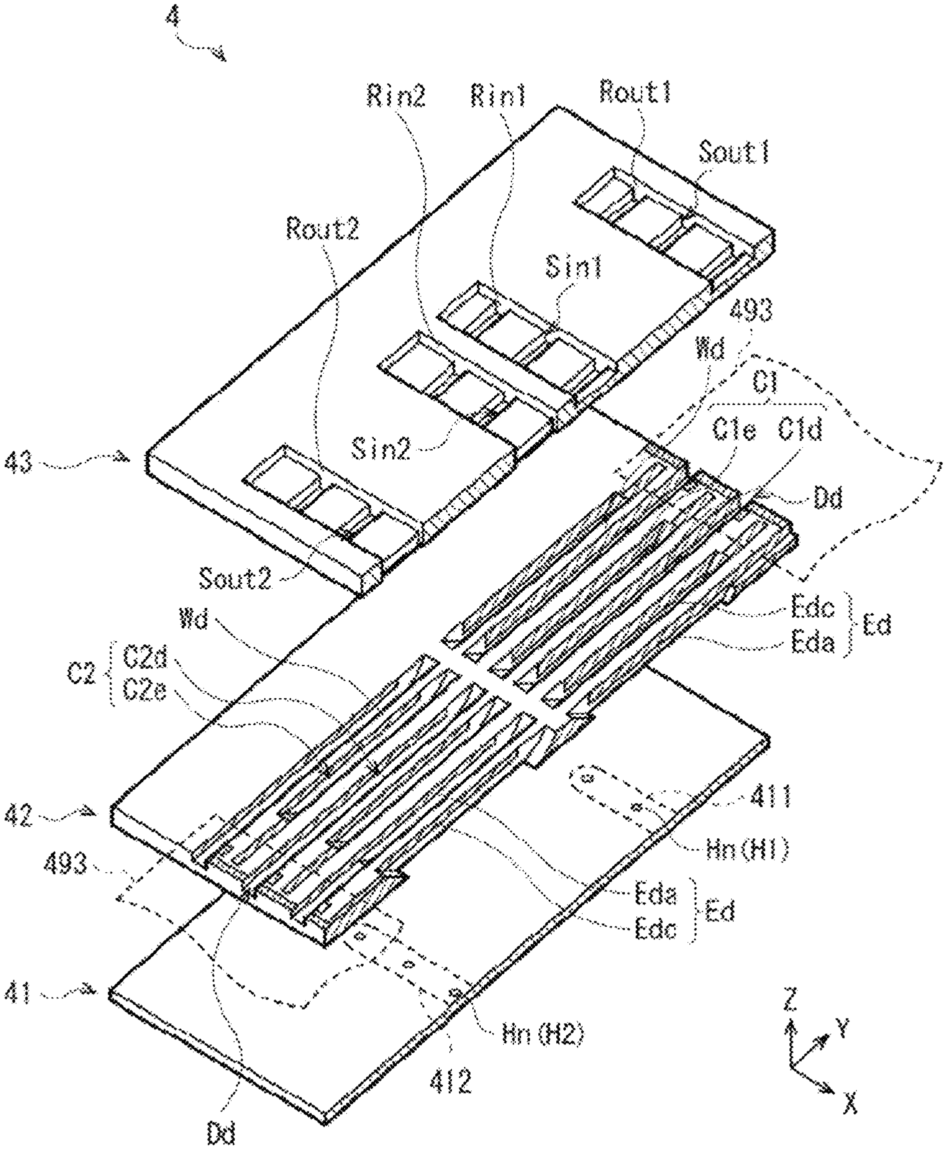
FIG. 3 is an exploded perspective view showing a detailed configuration example of the liquid jet head shown in FIG. 1.
Figure 4:
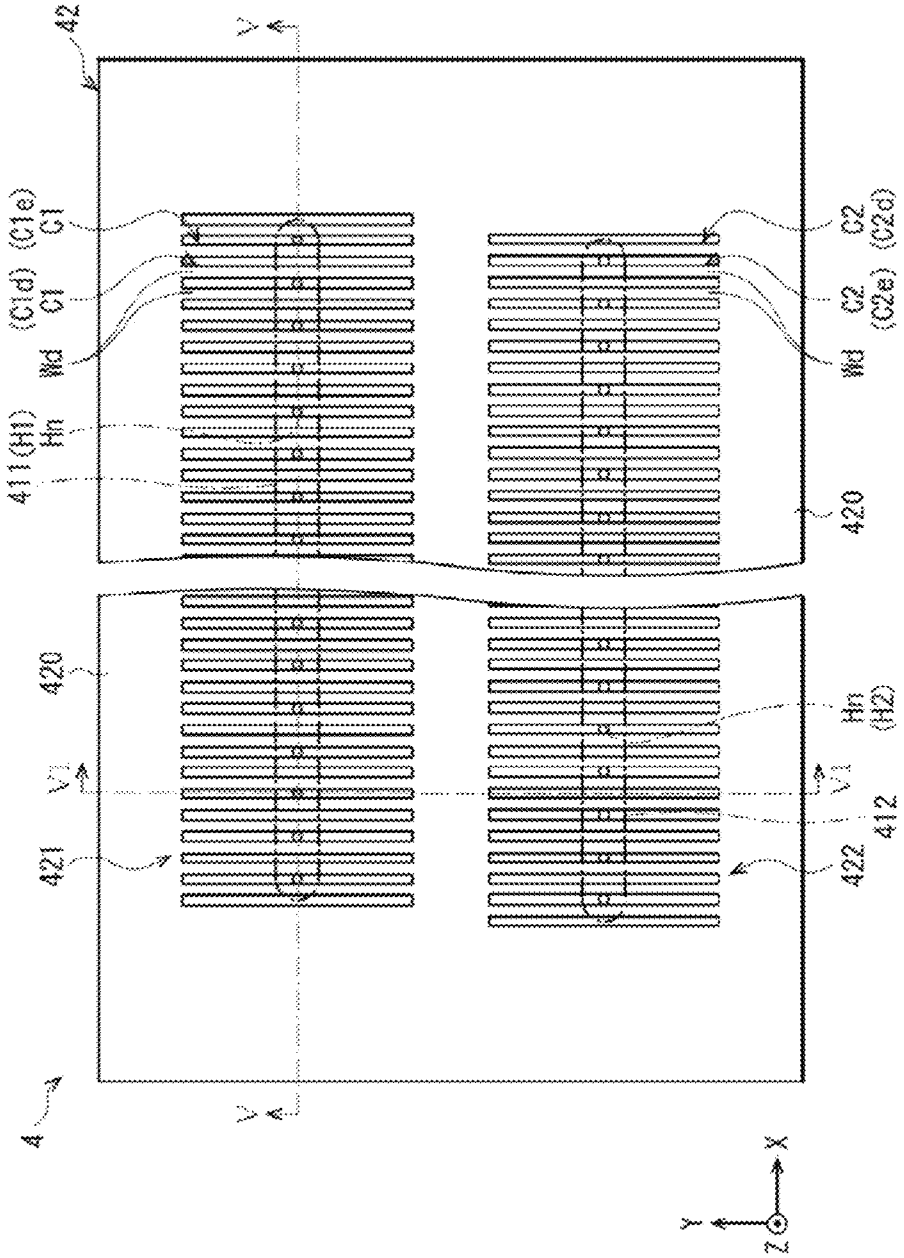
FIG. 4 is a schematic diagram showing a planar configuration example of an actuator plate and so on shown in FIG. 3.
Figure 5:
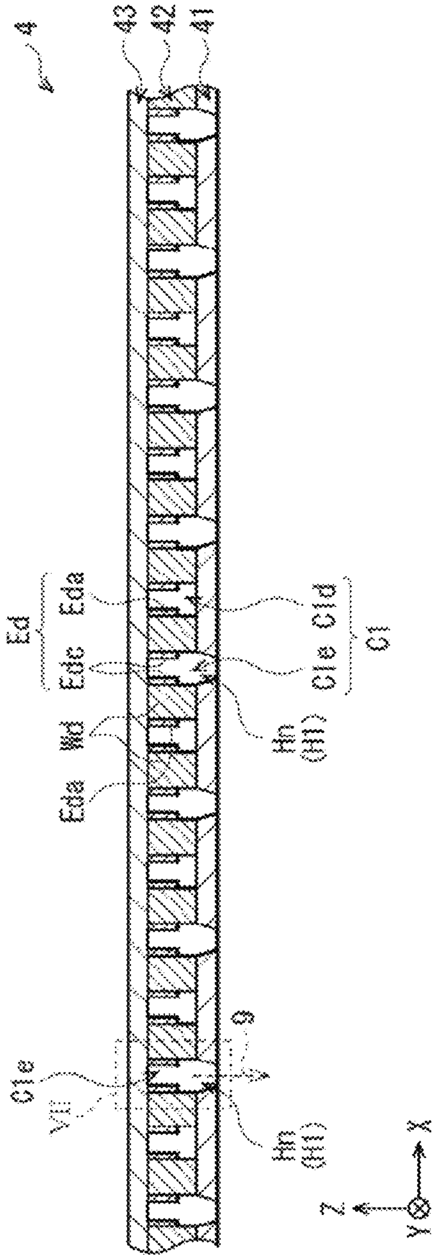
FIG. 5 is a schematic diagram showing a cross-sectional configuration example along the line V-V shown in FIG. 4.
Figure 6:
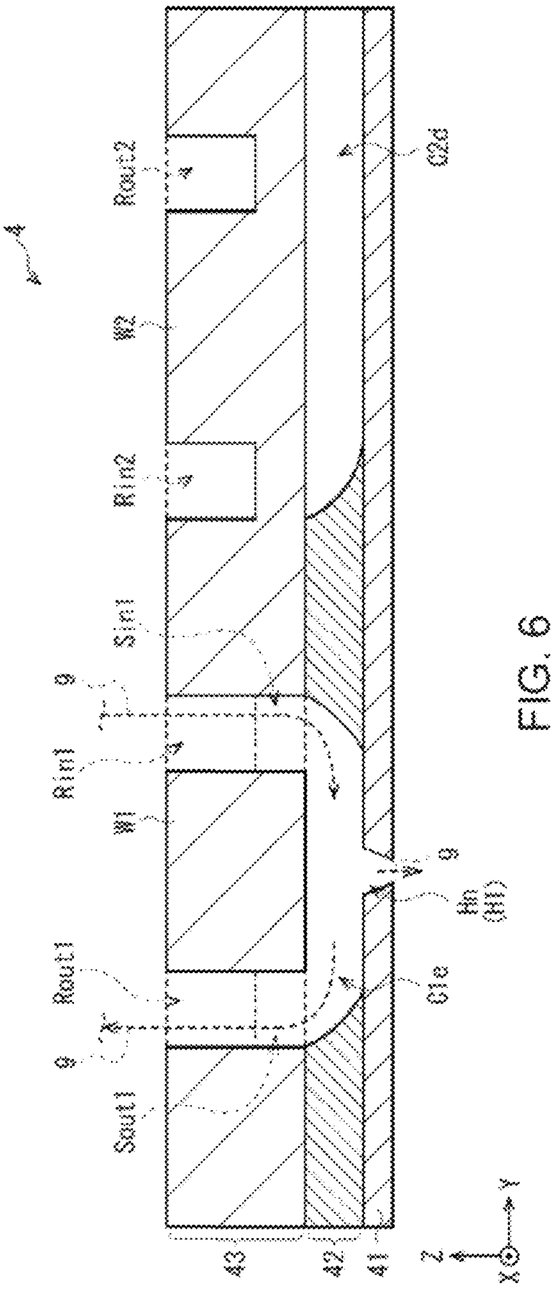
FIG. 6 is a schematic diagram showing a cross-sectional configuration example along the line VI-VI shown in FIG. 4.
Figure 7:
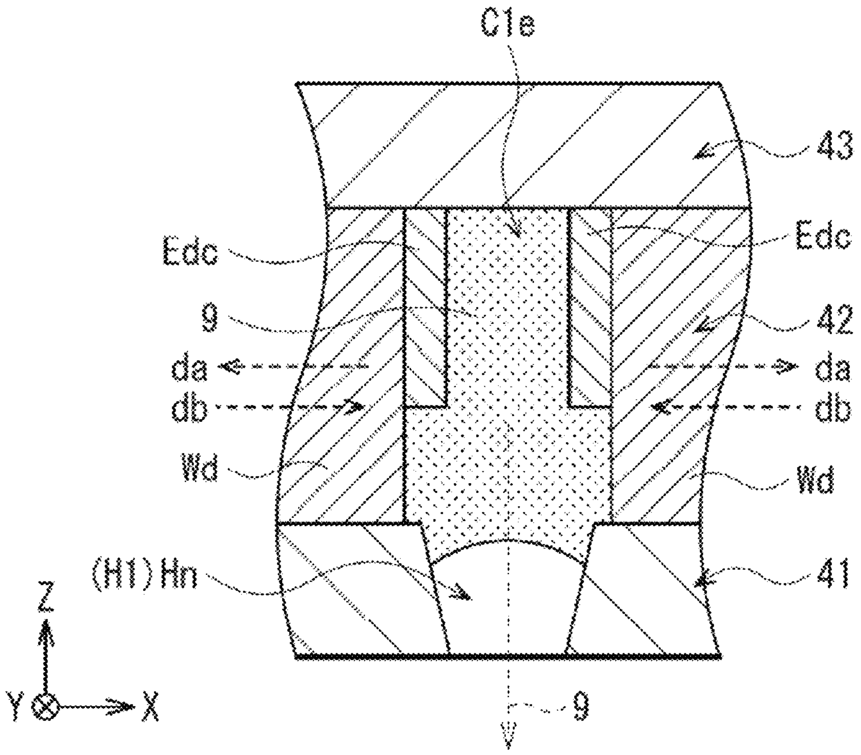
FIG. 7 is a schematic cross-sectional view showing, in an enlarged manner, the part VII shown in FIG. 5.

FIG. 2 is a diagram schematically showing the schematic configuration example of each of the inkjet heads 4. It should be noted that in FIG. 2, a cover plate 43 described later is omitted from the illustration for the sake of convenience. FIG. 3 is an exploded perspective view showing a detailed configuration example the inkjet head 4 shown in FIG. 1. FIG. 4 schematically shows a planar configuration example (a configuration example in the X-Y plane) of an actuator plate 42 and so on shown in FIG. 3. It should be noted that in FIG. 4 described above, the actuator plate 42 of the inkjet head 4 is selectively shown for the sake of convenience. FIG. 5 is a diagram schematically showing a cross-sectional configuration example (a configuration example in a Z-X cross-sectional surface) along the line V-V shown in FIG. 4, and FIG. 6 is a diagram schematically showing a cross-sectional configuration example (a configuration example in a Z-Y cross-sectional surface) along the line VI-VI shown in FIG. 4. FIG. 7 is a cross-sectional view (a Z-X cross-sectional view) schematically showing, in an enlarged manner, the part VII shown in FIG. 5.

The inkjet heads 4 according to the present embodiment are each an inkjet head of a so-called side-shoot type for ejecting the ink 9 from a central portion in the extending direction (the Y-axis direction) of each of a plurality of channels (channels C1, C2) described later. Further, as shown in FIG. 2 to FIG. 7, this inkjet head 4 has a nozzle plate 41, the actuator plate 42, the cover plate 43, and a drive unit 49.

It should be noted that the nozzle plate 41, the actuator plate 42, and the cover plate 43 correspond to a specific example of a "jet unit" in the present disclosure.

The nozzle plate 41, the actuator plate 42, and the cover plate 43 described above are bonded to each other using, for example, an adhesive, and are stacked on one another in this order along the Z-axis direction. Further, it is also possible to arrange that a flow channel plate (not shown) having predetermined flow channels is disposed on an upper surface of the cover plate 43. It should be noted that the description will hereinafter be presented referring to the cover plate 43 side along the Z-axis direction as an upper side, and referring to the nozzle plate 41 side as a lower side, as appropriate.

(B-1. Nozzle Plate 41)

The nozzle plate 41 is a plate formed of a film material such as polyimide, or a metal material, and has the plurality of nozzle holes Hn (H1, H2) for jetting the ink 9 (see FIG. 2 to FIG. 7). These nozzle holes Hn are formed side by side in alignment (along the X-axis direction in this example) at predetermined intervals. Further, as shown in FIG. 3 and FIG. 4, the nozzle plate 41 is provided with two nozzle columns (nozzle columns 411, 412) each extending along the X-axis direction. These nozzle columns 411, 412 are arranged along the Y-axis direction at a predetermined distance. As described above, the inkjet heads 4 are each formed as a two-column type inkjet head.

The nozzle column 411 has a plurality of nozzle holes H1 formed in alignment with each other at predetermined intervals along the X-axis direction. These nozzle holes H1 each penetrate the nozzle plate 41 along the thickness direction (the Z-axis direction) of the nozzle plate 41, and are communicated with respective ejection channels Cle in the actuator plate 42 described later. Specifically, as shown in FIG. 4, each of the nozzle holes H1 is formed so as to be located in a central portion along the Y-axis direction on the ejection channel Cle. Further, the formation pitch along the X-axis direction in the nozzle holes H1 is arranged to be the same (the same pitch) as the formation pitch along the X-axis direction in the ejection channels Cle. Although the details will be described later, it is arranged that the ink 9 supplied from the inside of the ejection channel Cle is ejected (jetted) from each of the nozzle holes H1 in such a nozzle column 411.

The nozzle column 412 similarly has a plurality of nozzle holes H2 formed in alignment with each other at predetermined intervals along the X-axis direction. Each of these nozzle holes H2 also penetrates the nozzle plate 41 along the thickness direction of the nozzle plate 41, and is communicated with an ejection channel C2*e* in the actuator plate 42 described later. Specifically, as shown in FIG. 4, each of the nozzle holes H2 is formed so as to be located in a central portion along the Y-axis direction on the ejection channel C2*e*. Further, the formation pitch along the X-axis direction in the nozzle holes H2 is arranged to be the same as the formation pitch along the X-axis direction in the ejection channels C2*e*. Although the details will be described later, it is arranged that the ink 9 supplied from the inside of the ejection channel C2*e* is also ejected from each of the nozzle holes H2 in such a nozzle column 412.

It should be noted that such nozzle holes Hn (H1, H2) are each formed as a tapered through hole gradually decreasing in diameter in a direction toward the lower side (see FIG. 2, and FIG. 5 to FIG. 7), and each correspond to a specific example of a "nozzle" in the present disclosure.

(B-2. Actuator Plate 42)

The actuator plate 42 is a plate formed of a piezoelectric material such as lead zirconium titanate (PZT), and is arranged to change the capacity of each of the ejection channels C1*e*, C2*e* although the details will be described later. The actuator plate 42 is formed of, for example, a single (unitary) piezoelectric substrate having the polarization direction set to one direction along the thickness direction (the Z-axis direction) (a so-called cantilever type). It should be noted that the configuration of the actuator plate 42 is not limited to the cantilever type. Specifically, it is possible to arrange that the actuator plate 42 is constituted by stacking two piezoelectric substrates different in polarization direction from each other on one another along the thickness direction (the Z-axis direction) (a so-called chevron type).

Further, as shown in FIG. 3 and FIG. 4, the actuator plate 42 is provided with two channel columns (channel columns 421, 422) each extending along the X-axis direction. These channel columns 421, 422 are arranged at a predetermined distance along the Y-axis direction.

In such an actuator plate 42, as shown in FIG. 4, a central portion (the formation area of the channel columns 421, 422) along the X-axis direction forms an ejection area (jetting area) of the ink 9. On the other hand, in the actuator plate 42, the both end parts (non-formation areas of the channel columns 421, 422) along the X-axis direction each correspond to a non-ejection area (non-jetting area) of the ink 9. The non-ejection areas are each located at the outer side along the X-axis direction with respect to the ejection area described above. It should be noted that both end portions along the Y-axis direction in the actuator plate 42 each form a tail part 420 (see FIG. 4).

As shown in FIG. 3 and FIG. 4, the channel column 421 described above has a plurality of channels C1 each extending along the Y-axis direction. These channels C1 are arranged side by side so as to be parallel to each other at predetermined intervals along the X-axis direction. As shown in FIG. 3, FIG. 5, and FIG. 7, each of the channels C1 is partitioned with drive walls Wd formed of a piezoelectric body (the actuator plate 42), and forms a groove part having a recessed shape in a cross-sectional view.

As shown in FIG. 3 and FIG. 4, the channel column 422 similarly has a plurality of channels C2 each extending along the Y-axis direction. These channels C2 are arranged side by side so as to be parallel to each other at predetermined intervals along the X-axis direction. The channels C2 are also partitioned by the drive walls Wd described above, and each form a groove part having a recessed shape in a cross-sectional view as shown in FIG. 3. It should be noted that although described later in detail, each of the drive walls Wd is arranged to function as an element (a piezoelectric element) for individually pressurizing the inside of each of the channels C1, C2 (each of the ejection channels C1*e*, C2*e* described later).

Here, as shown in FIG. 3 to FIG. 5, as the channels C1, there exist the ejection channels C1*e* for ejecting the ink 9 (filled with the ink 9), and dummy channels C1*d* not ejecting the ink 9 (not filled with the ink 9). In the channel column 421, the ejection channels C1*e* and the dummy channels C1*d* are alternately arranged along the X-axis direction via the drive walls Wd described above. The ejection channels C1*e* are individually communicated with the nozzle holes H1 in the nozzle plate 41 on the one hand, but the dummy channels C1*d* are not communicated with the nozzle holes H1, and are covered with the upper surface of the nozzle plate 41 from below on the other hand (see FIG. 5).

Similarly, as shown in FIG. 3 and FIG. 4, as the channels C2, there exist the ejection channels C2*e* for ejecting the ink 9 (filled with the ink 9), and dummy channels C2*d* not ejecting the ink 9 (not filled with the ink 9). In the channel column 422, the ejection channels C2*e* and the dummy channels C2*d* are alternately arranged along the X-axis direction via the drive walls Wd described above. The ejection channels C2*e* are individually communicated with the nozzle holes H2 in the nozzle plate 41 on the one hand, but the dummy channels C2*d* are not communicated with the nozzle holes H2, and are covered with the upper surface of the nozzle plate 41 from below on the other hand.

It should be noted that such ejection channels C1*e*, C2*e* each correspond to a specific example of the "pressure chamber" in the present disclosure.

As shown in FIG. 3 and FIG. 4, the ejection channels C1*e* and the dummy channels C1*d* as the channels C1 and the ejection channels C2*e* and the dummy channels C2*d* as the channels C2 are arranged in a staggered manner. Therefore, in each of the inkjet heads 4, the ejection channels C1*e* in the channels C1 and the ejection channels C2*e* in the channels C2 are arranged in a zigzag manner. It should be noted that as shown in FIG. 3, in the actuator plate 42, in a portion corresponding to each of the dummy channels C1*d*, C2*d*, there is formed a shallow groove part Dd communicated with an outside end portion extending along the Y-axis direction in the dummy channel C1*d*, C2*d*.

Further, as shown in FIG. 3 and FIG. 6, the ejection channels C1*e* each have side surfaces each shaped like a circular arc in which the cross-sectional area of each of the ejection channels C1*e* gradually decreases in a direction from the cover plate 43 side (upper side) toward the nozzle plate 41 side (lower side). Similarly, as shown in FIG. 3, the ejection channels C2*e* each have side surfaces each shaped like a circular arc in which the cross-sectional area of each of the ejection channels C2*e* gradually decreases in the direction from the cover plate 43 side toward the nozzle plate 41 side. It should be noted that it is arranged that the side surfaces shaped like a circular arc in such ejection channels C1*e*, C2*e* are each formed by, for example, cutting work using a dicer.

Here, as shown in FIG. 3, FIG. 5, and FIG. 7, drive electrodes Ed extending along the Y-axis direction are disposed on the inner side surfaces opposed to each other in the drive wall Wd described above. In other words, a pair of drive electrodes Ed are arranged so as to be opposed to each other across each of the drive walls Wd. As the drive electrodes Ed, there exist common electrodes Edc disposed on the inner side surfaces facing the ejection channels C1*e*, C2*e*, and individual electrodes Eda (active electrodes) disposed on the inner side surfaces facing the dummy channels C1*d*, C2*d*. It should be noted that each of such drive electrodes Ed (the common electrodes Edc and the individual electrodes Eda) is not formed beyond an intermediate position in the depth direction (the Z-axis direction) on the inner side surface of the drive wall Wd as shown in FIG. 3, FIG. 5, and FIG. 7.

The pair of common electrodes Edc opposed to each other in the same ejection channel C1*e* (or the same ejection channel C2*e*) are electrically coupled to each other in a common terminal (not shown). Further, the pair of individual electrodes Eda opposed to each other in the same dummy channel C1*d* (or the same dummy channel C2*d*) are electrically separated from each other. Meanwhile, the pair of individual electrodes Eda opposed to each other via the ejection channel C1*e* (or the ejection channel C2*e*) are electrically coupled to each other in an individual terminal (not shown).

Here, in the tail part 420 described above, there is mounted a flexible printed board 493 for electrically coupling the drive electrodes Ed and the drive unit 49 as shown in FIG. 3. Wiring patterns (not shown) provided to the flexible printed board 493 are electrically coupled to the common terminal and the individual terminals described above. Thus, it is arranged that a drive voltage Vd (a drive signal Sd) or the like described later is applied to each of the drive electrodes Ed from the drive unit 49 described later via the flexible printed board 493 (see FIG. 2).

(B-3. Cover Plate 43)

As shown in FIG. 3, and FIG. 5 to FIG. 7, the cover plate 43 is disposed so as to close the channels C1, C2 (the channel columns 421, 422) in the actuator plate 42. Specifically, the cover plate 43 is bonded to the upper surface of the actuator plate 42 to form a plate-like structure.

As shown in FIG. 3 and FIG. 6, the cover plate 43 is provided with a pair of supply-side common flow channels Rin1, Rin2 and a pair of recovery-side common flow channels Rout1, Rout2. Further, as shown in FIG. 6, the cover plate 43 is provided with wall parts W1, W2.

The wall part W1 is disposed so as to cover above the ejection channels C1*e* and the dummy channels C1*d*, and the wall part W2 is disposed so as to cover above the ejection channels C2*e* and the dummy channels C2*d* (see FIG. 6).

The supply-side common flow channels Rin1, Rin2 and the recovery-side common flow channels Rout1, Rout2 each extend along the X-axis direction, and are arranged side by side so as to be parallel to each other at predetermined distance along the Y-axis direction as shown in FIG. 3. The supply-side common flow channel Rin1 and the recovery-side common flow channel Rout1 are each formed in an area corresponding to the channel column 421 (the plurality of channels C1) in the actuator plate 42 (see FIG. 3 and FIG. 6). In contrast, the supply-side common flow channel Rin2 and the recovery-side common flow channel Rout2 are each formed in an area corresponding to the channel column 422 (the plurality of channels C2) in the actuator plate 42 (see FIG. 3 and FIG. 6).

The supply-side common flow channel Rin1 is formed in the vicinity of an end portion at an inner side (at one side of the wall part W1) along the Y-axis direction in each of the channels C1, and forms a groove part having a recessed shape (see FIG. 3 and FIG. 6). In areas corresponding respectively to the ejection channels C1*e* in the supply-side common flow channel Rin1, there are formed supply slits Sin1 penetrating the cover plate 43 along the thickness direction (the Z-axis direction) of the cover plate 43 (see FIG. 3 and FIG. 6). Similarly, the supply-side common flow channel Rin2 is formed in the vicinity of an end portion at an inner side (at one side of the wall part W2) along the Y-axis direction in each of the channels C2, and forms a groove part having a recessed shape (see FIG. 3 and FIG. 6). In areas corresponding respectively to the ejection channels C2*e* in the supply-side common flow channel Rin2, there are formed supply slits Sin2 penetrating the cover plate 43 along the thickness direction of the cover plate 43 (see FIG. 3).

The recovery-side common flow channel Rout1 is formed in the vicinity of an end portion at an outer side (at the other side of the wall part W1) along the Y-axis direction in each of the channels C1, and forms a groove part having a recessed shape (see FIG. 3 and FIG. 6). In areas corresponding respectively to the ejection channels C1*e* in the recovery-side common flow channel Rout1, there are formed recovery slits Sout1 penetrating the cover plate 43 along the thickness direction of the cover plate 43 (see FIG. 3 and FIG. 6). Similarly, the recovery-side common flow channel Rout2 is formed in the vicinity of an end portion at an outer side (at the other side of the wall part W2) along the Y-axis direction in each of the channels C2, and forms a groove part having a recessed shape (see FIG. 3 and FIG. 6). In areas corresponding respectively to the ejection channels C2*e* in the recovery-side common flow channel Rout2, there are formed recovery slits Sout2 penetrating the cover plate 43 along the thickness direction of the cover plate 43 (see FIG. 3).

It should be noted that the supply-side common flow channels Rin1, Rin2 each correspond to a specific example of a "liquid supply chamber" in the present disclosure. Further, the recovery-side common flow channels Rout1, Rout2 each correspond to a specific example of a "liquid recovery chamber" in the present disclosure.

In such a manner, it is arranged that the supply-side common flow channel Rin1 and the recovery-side common flow channel Rout1 are communicated with each of the ejection channels C1*e* via the supply slit Sin1 and the recovery slit Sout1, respectively (see FIG. 3 and FIG. 6). Further, the supply slit Sin1 and the recovery slit Sout1 form through holes through which the ink 9 flows to and from the ejection channel C1*e*, respectively. Particularly, it is arranged that the supply-side common flow channel Rin1 supplies the ink 9 to the inside of the ejection channel C1*e* via the supply slit Sin1, and the recovery-side common flow channel Rout1 recovers the ink 9 from the inside of the ejection channel C1*e* via the recovery slit Sout1 (see the dotted arrow in FIG. 6). In contrast, neither the supply-side common flow channel Rin1 nor the recovery-side common flow channel Rout1 is communicated with the dummy channels C1*d*. Specifically, each of the dummy channels C1*d* is arranged to be closed by bottom portions in the supply-side common flow channel Rin1 and the recovery-side common flow channel Rout1.

Similarly, it is arranged that the supply-side common flow channel Rin2 and the recovery-side common flow channel Rout2 are communicated with each of the ejection channels C2*e* via the supply slit Sin2 and the recovery slit Sout2, respectively (see FIG. 3). Further, the supply slit Sin2 and the recovery slit Sout2 form through holes through which the ink 9 flows to and from the ejection channel C2*e*, respectively. Particularly, it is arranged that the supply-side common flow channel Rin2 supplies the ink 9 to the inside of the ejection channel C2*e* via the supply slit Sin2, and the recovery-side common flow channel Rout2 recovers the ink 9 from the inside of the ejection channel C2*e* via the recovery slit Sout2. In contrast, neither the supply-side common flow channel Rin2 nor the recovery-side common flow channel Rout2 is communicated with the dummy channels C2*d* (see FIG. 6). Specifically, each of the dummy channels C2*d* is arranged to be closed by bottom portions in the supply-side common flow channel Rin2 and the recovery-side common flow channel Rout2 (see FIG. 6).

(B-4. Drive Unit 49)

As shown in FIG. 2, the drive unit 49 is for performing ejection drive of the ink 9 using the drive signal Sd (the drive voltage Vd). On this occasion, the drive unit 49 is arranged to output such a drive signal Sd (such a drive voltage Vd) based on a variety of types of data (signals) supplied from a print control unit (not shown) located inside the printer 1 (inside the inkjet head 4).

Further, the drive unit 49 drives the actuator plate 42 so that the ink 9 filling the ejection channels C1*e*, C2*e* described above is ejected from the nozzle holes Hn (H1, H2), to thereby perform the ejection drive (see FIG. 2, and FIG. 5 to FIG. 7). Specifically, the drive unit 49 is arranged to apply the drive voltages Vd (the drive signals Sd) described above to the actuator plate 42 to expand and contract the ejection channels C1*e*, C2*e* to thereby jet the ink 9 from the respective nozzle holes Hn (make the actuator plate 42 perform the jetting operation).

Further, although described later in detail, the drive unit 49 drives the actuator plate 42 based on a first drive signal Sd1 as the drive signal Sd when performing the printing operation on the recording paper P (recording target medium). Meanwhile, the drive unit 49 is arranged to drive the actuator plate 42 based on a second drive signal Sd2 as the drive signal Sd when performing the flushing operation (a non-printing operation) of performing dummy ejection of the ink 9 from the nozzle holes Hn.

(C. Detailed Configuration of Drive Voltage Vd and Drive Signal Sd)

Subsequently, a detailed configuration example of the drive voltages Vd and the drive signals Sd (Sd1, Sd2) described above will be described with reference to FIG. 8 to FIG. 10.

Figure 8:
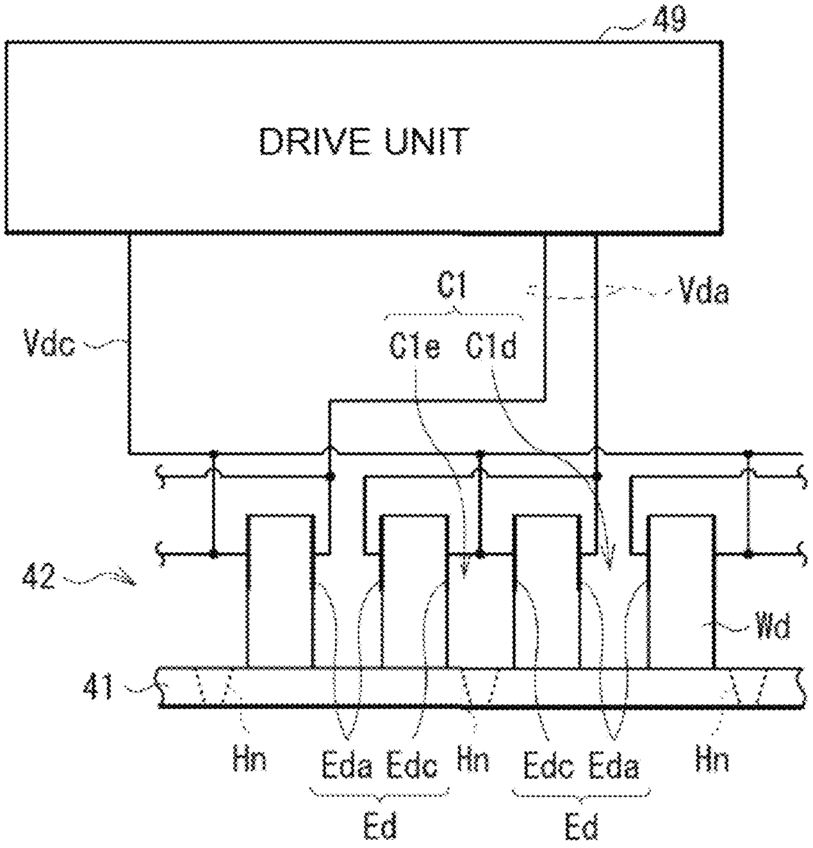
FIG. 8 is a schematic diagram showing a supply channel example of electrical potentials to be supplied from a drive unit to drive electrodes.

FIG. 8 is a diagram schematically showing supply channel examples of the electrical potentials supplied from the drive unit 49 to the drive electrodes Ed (the individual electrodes Eda and the common electrodes Edc). Specifically, FIG. 8 shows the supply channel examples related to the channel C1 regarding the electrical potentials (individual potentials Vda) supplied to the individual electrodes Eda and an electrical potential (a common potential Vdc) supplied to the common electrodes Edc, respectively. It should be noted that although not shown in FIG. 8 for the sake of convenience, the same applies also to the supply channel example (the supply channel example of the individual potentials Vda and the common potential Vdc) related to the channel C2.

Figures 9A, 9B:
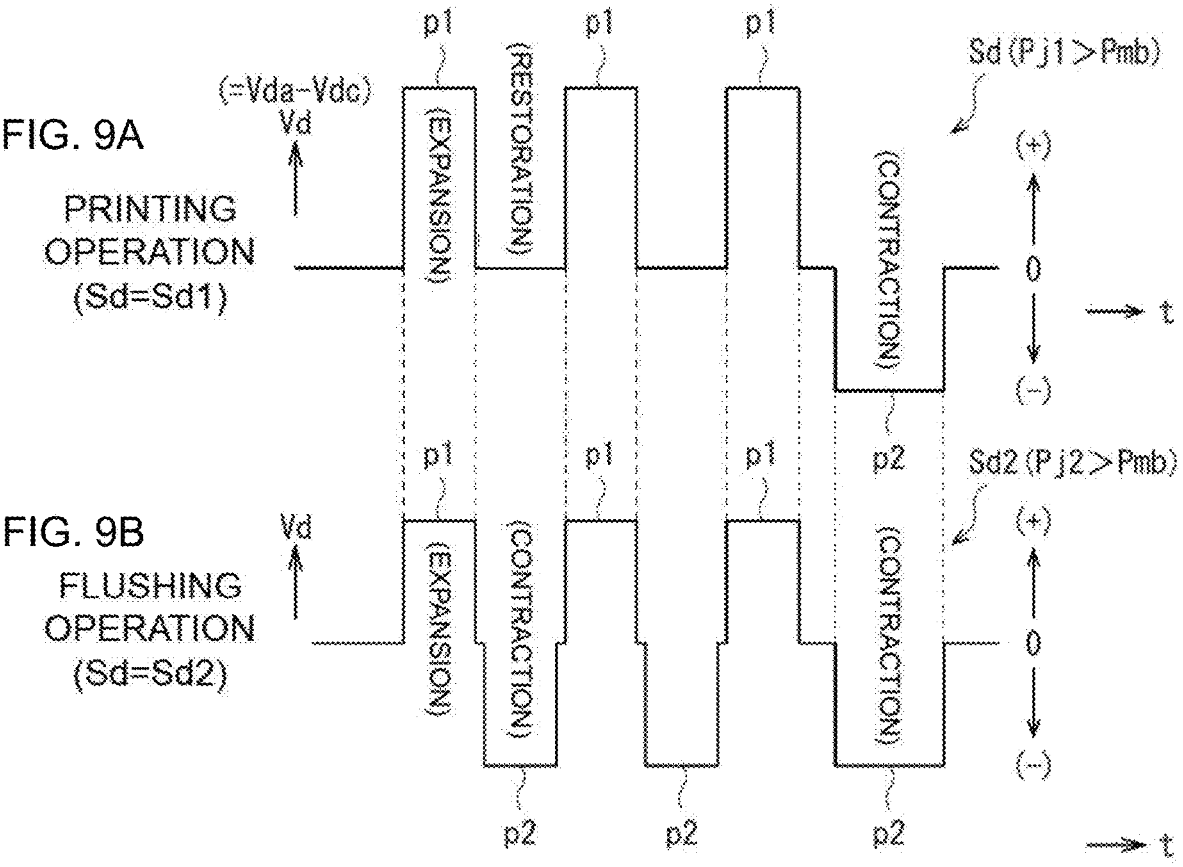
FIGS. 9A and 9B are timing charts schematically showing a waveform example of a drive signal when performing a printing operation and a flushing operation, respectively.
Figures 10A, 10B, 10C, 10D:
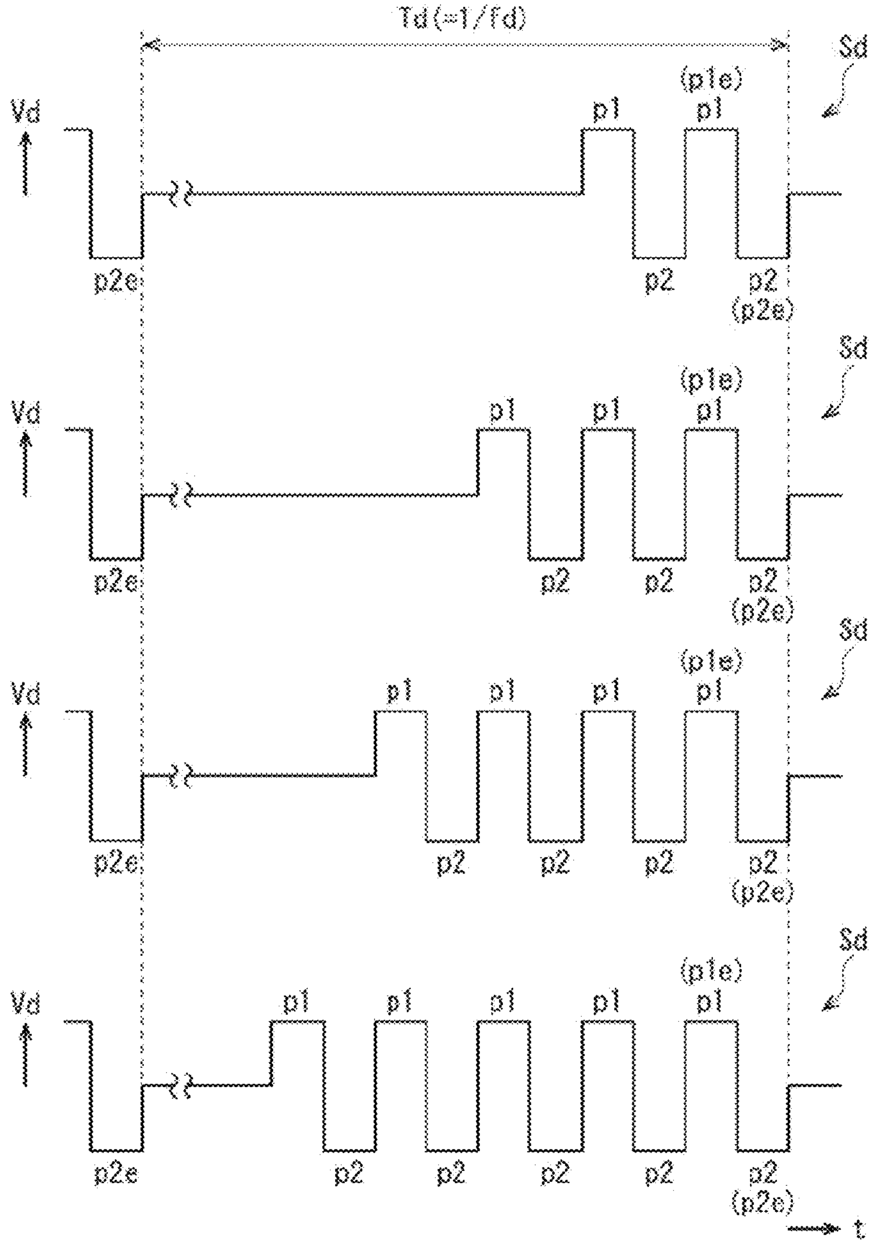
FIGS. 10A, 10B, 10C and 10D are timing charts schematically showing a variety of waveform examples in the drive signal.

Further, FIGS. 9A, 9B are each a timing chart schematically showing a waveform example of the drive signal Sd when performing the printing operation or the flushing operation described above. Specifically, FIG. 9A shows the waveform example of the drive signal Sd (the first drive signal Sd1 described above) when performing the printing operation, and FIG. 9B shows the waveform example of the drive signal Sd (the second drive signal Sd2 described above) when performing the flushing operation. Further, FIGS. 10A to 10D are timing charts schematically showing a variety of waveform examples of the drive signal Sd.

It should be noted that in all of FIGS. 9A, 9B, and FIGS. 10A to 10D, the vertical axis represents a voltage value of the drive voltage Vd (corresponding to a potential difference between the individual potential Vda and the common potential Vdc described above; Vd=Vda−Vdc), and the horizontal axis represents time t. Further, the magnitude of such a drive voltage Vd corresponds to a volume of each of the ejection channels C1_e_, C2_e_ described above. Further, when the drive voltage Vd has a positive (+) value, and when the drive voltage Vd has a negative (−) value represent a state in which the volume expands compared to a reference value, and a state in which the volume contracts compared to the reference value, respectively (see FIGS. 9A, 9B).

Incidentally, in the example shown in FIGS. 9A, 9B, the common potential Vdc is set to a predetermined positive potential (Vdc>0)) to thereby arrange that the drive voltage Vd (the potential difference between the individual potential Vda and the common potential Vdc) is set to a negative value (Vd<0), but this example is not a limitation. Specifically, it is also possible to arrange that, for example, the drive voltage Vd is directly set to a negative value (Vd<0) by setting the common potential Vdc to Vdc=((a ground potential), and at the same time, setting the individual potential Vda to a predetermined negative potential (Vda<0). Even in the case of such drive, it is possible to perform substantially the same drive (a pressure variation in the actuator plate 42) as the drive examples shown in FIGS. 9A, 9B.

In the examples shown in FIGS. 9A, 9B, and FIGS. 10A to 10D, the drive signals Sd (Sd1, Sd2) are signals (signals to which a so-called "multi-pass method" is applied) having a plurality of pulses (pulses p1, p2) are included in one cycle (a drive period Td described below). The pulse p1 is a pulse (an expansion pulse) for expanding the volume of the ejection channels C1_e_, C2_e_, and the pulse p2 is a pulse (a contraction pulse) for contracting the volume of the ejection channels C1_e_, C2_e_. Further, in each of the examples shown in FIGS. 10A to 10D, out of the plurality of pulses in one cycle (the drive period Td), the first pulse is set as the pulse p1, and the last pulse is set as the pulse p2. It should be noted that the first pulse in the drive period Td may be set as either of the pulse p1 (the expansion pulse) and the pulse p2 (the contraction pulse). It should be noted that in FIGS. 10A to 10D, the last pulse p1 in the drive period Td is described as a pulse ple (a last expansion pulse), and the last pulse p2 in the drive period Td is described as a pulse p2_e_ (a last contraction pulse).

Here, the "one cycle (=the drive period Td)" described above means a time interval for forming one pixel (dot) on the recording paper P (the recording target medium). Further, a drive frequency fd in the drive signals Sd shown in FIGS. 10A to 10D is set as the reciprocal (fd=1/Td) of the drive period Td. Further, in other words, the drive frequency fd corresponds to the number of pixels (the number of dots) formed per second on the recording paper P (the recording target medium).

(D. Drive Example When Performing Printing Operation/Flushing Operation)

Subsequently, the drive examples when performing the printing operation and the flushing operation described above will be described in detail with reference to FIG. 11 in addition to FIG. 8, FIGS. 9A, 9B, and FIGS. 10A to 10D. FIG. 11 shows a variety of method examples (examples of a method A through a method D described later) when performing the flushing operation shown in FIG. 9B collectively as a table.

First, when performing the printing operation shown in FIG. 9A, the drive unit 49 performs the ejection drive (a drive operation on the actuator plate 42) in such a manner as described below based on the first drive signal Sd1 described above. In other words, when performing the printing operation, the drive unit 49 performs the ejection drive so that the ejection strength Pj1 lower than the meniscus breaking strength Pmb (Pj1<Pmb) for breaking the meniscus in the ejection channels C1_e_, C2_e_ is achieved based on the first drive signal Sd1.

In contrast, when performing the flushing operation shown in FIG. 9B, the drive unit 49 performs the ejection drive in the following manner based on the second drive signal Sd2 described above. Specifically, when performing the flushing operation, the drive unit 49 performs the ejection drive so as to achieve the ejection strength Pj2 higher than the meniscus breaking strength Pmb (Pj2>Pmb) described above based on the second drive signal Sd2.

It should be noted that the "meniscus breaking strength" in the present embodiment means the ejection strength with which the meniscus in the ejection channels C1_e_, C2_e_ is broken, and bubbles are drawn from the nozzle holes Hn into the ejection channels C1_e_, C2_e_ to thereby form a gas-liquid two-phase flow (see FIG. 12 described below) formed of the ink 9 supplied by being circulated between the inkjet head 4 and the outside (the ink tank 3) and the bubbles. Further, the "ejection strength" in the present embodiment means "an amount of energy to be applied to the actuator (the actuator plate 42)." The definitions of the "meniscus breaking strength" and the "ejection strength" also apply to modified examples described below.

Here, when performing such a flushing operation, as a method of realizing ((the ejection strength Pj2)> (the meniscus breaking strength Pmb)), there can be cited, for example, the methods (the method A through the method D) shown in FIG. 11.

First, in the method A, as in the example shown in FIG. 9B described above, for example, the drive unit 49 increases the pulse number Np2 (the number of the pulses p1, p2 included in the drive period Td) in the second drive signal Sd2 to a number larger than the pulse number in the first drive signal Sd1 when performing the printing operation. Specifically, the drive unit 49 increases the pulse number Np2 in the second drive signal Sd2 when performing the flushing operation to a number larger than a threshold pulse number Nth corresponding to the meniscus breaking strength Pmb (Np2>Nth). In this method A, since the pulse number Np2 is set in such a manner, the ejection strength Pj2 when performing the flushing operation is set so as to become higher than the meniscus breaking strength Pmb as described above.

Further, in the method B, the drive unit 49 increases the drive voltage Vd=Vd2 in the second drive signal Sd2 to a value higher than the drive voltage Vd in the first drive signal Sd1 when performing the printing operation. Specifically, the drive unit 49 increases the drive voltage Vd2 in the second drive signal Sd2 when performing the flushing operation to a value higher than a threshold voltage Vth corresponding to the meniscus breaking strength Pmb (Vd2>Vth). In this method B, since the drive voltage Vd2 is set in such a manner, the ejection strength Pj2 when performing the flushing operation is set so as to become higher than the meniscus breaking strength Pmb as described above.

Further, in the method C, the drive unit 49 increases the drive frequency fd=fd2 in the second drive signal Sd2 to a value higher than the drive frequency fd in the first drive signal Sd1 when performing the printing operation. Specifically, the drive unit 49 increases the drive frequency fd2 in the second drive signal Sd2 when performing the flushing operation to a value higher than a threshold frequency fth corresponding to the meniscus breaking strength Pmb (fd2>fth). In this method C, since the drive frequency fd2 is set in such a manner, the ejection strength Pj2 when performing the flushing operation is set so as to become higher than the meniscus breaking strength Pmb as described above.

Further, in the method D, the drive unit 49 sets the pulse width Wp2 in the pulses (the pulses p1, p2) included in the second drive signal Sd2 when performing the flushing operation to a resonance period (AP: Acoustic Period) (Wp2=AP). In this method D, since the pulse width Wp2 is set in such a manner, the ejection strength Pj2 when performing the flushing operation is set so as to become higher than the meniscus breaking strength Pmb as described above.

Incidentally, the AP corresponds to a period (1 AP=(characteristic vibration period of the ink 9)/2) half as large as the characteristic vibration period of the ink 9 in the ejection channels C1*e*, C2*e*. Further, when the pulse width of a certain pulse is set to the AP, the ejection speed (the ejection efficiency) of the ink 9 is maximized when ejecting (making one droplet ejection of) the ink 9 as much as one normal droplet. Further, the AP is arranged to be defined by, for example, the shape of the ejection channels C1*e*, C2*e* or a physical property (the specific gravity or the like) of the ink 9.

It should be noted that the threshold voltage Vth described above corresponds to a specific example of a "first threshold value" in the present disclosure. Further, the threshold frequency fth described above corresponds to a specific example of a "second threshold value" in the present disclosure. Further, the threshold pulse number Nth described above corresponds to a specific example of a "third threshold value" in the present disclosure.

Operations and Functions/Advantages (A. Basic Operation of Printer 1)

In the printer 1, a recording operation (the printing operation) of images, characters, and so on to the recording paper P is performed in the following manner. It should be noted that as an initial state, it is assumed that the four types of ink tanks 3 (3Y, 3M, 3C, and 3K) shown in FIG. 1 are sufficiently filled with the ink 9 of the corresponding colors (the four colors), respectively. Further, there is achieved the state in which the inkjet heads 4 are filled with the ink 9 in the ink tanks 3 via the ink supply tubes 50, respectively.

In such an initial state, when making the printer 1 operate, the grid rollers 21 in the conveying mechanisms 2*a*, 2*b* each rotate to thereby convey the recording paper P along the conveyance direction d (the X-axis direction) between the grid rollers 21 and the pinch rollers 22. Further, at the same time as such a conveyance operation, the drive motor 633 in the drive mechanism 63 rotates each of the pulleys 631*a*, 631*b* to thereby make the endless belt 632 operate. Thus, the carriage 62 reciprocates along the width direction (the Y-axis direction) of the recording paper P while being guided by the guide rails 61*a*, 61*b*. Then, on this occasion, the four colors of ink 9 are appropriately ejected on the recording paper P by the respective inkjet heads 4 (4Y, 4M, 4C, and 4K) to thereby perform the recording operation of images, characters, and so on to the recording paper P.

(B. Detailed Operation in Inkjet Head 4)

Subsequently, the detailed operation (the operation by the ejection drive) in the inkjet head 4 will be described.

First, in this inkjet head 4, the jet operation of the ink 9 using a shear mode is performed in the following manner. In other words, by the drive unit 49 performing the ejection drive using the drive signal Sd described above on the actuator plate 42, the ink 9 filling the ejection channels C1*e*, C2*e* is ejected from the nozzle holes Hn.

When performing such ejection drive, the drive unit 49 applies the drive voltages Vd (the drive signals Sd) to the drive electrodes Ed (the common electrodes Edc and the individual electrodes Eda) located inside the actuator plate 42. Specifically, the drive unit 49 applies the drive voltage Vd to the drive electrodes Ed (the common electrodes Edc and the individual electrodes Eda) disposed on the pair of drive walls Wd partitioning the ejection channels C1*e*, C2*e*. Thus, the pair of drive walls Wd deform so as to protrude toward the dummy channels C1*d*, C2*d* adjacent to the ejection channels C1*e*, C2*e*, respectively.

Here, as described above, in the actuator plate 42, the polarization direction is set to the one direction, and at the same time, the drive electrodes Ed are not formed beyond the intermediate position in the depth direction on the inner side surfaces in the drive walls Wd. Therefore, application of the drive voltage Vd using the drive unit 49 results in a flexion deformation of the drive wall Wd having a V shape centered on the intermediate position in the depth direction in the drive wall Wd. Further, due to such a flexion deformation of the drive wall Wd, the ejection channel C1*e*, C2*e* deforms as if the ejection channel C1*e*, C2*e* bulges (see the expansion directions da shown in FIG. 7).

Incidentally, in the case in which the configuration of the actuator plate 42 is not the cantilever type but is the chevron type described above, the drive wall Wd makes the flexion deformation to have the V shape in the following manner. Specifically, in the case of the chevron type, the polarization direction of the actuator plate 42 differs along the thickness direction (the two piezoelectric substrates described above are stacked on one another), and at the same time, the drive electrodes Ed are formed in the entire length in the depth direction on the inner side surface in each of the drive walls Wd. Therefore, application of the drive voltage Vd using the drive unit 49 described above results in a flexion deformation of the drive wall Wd having a V shape centered on the intermediate position in the depth direction in the drive wall Wd. As a result, also in this case, due to such a flexion deformation of the drive wall Wd, the ejection channel C1*e*, C2*e* deforms as if the ejection channel C1*e*, C2*e* bulges (see the expansion directions da shown in FIG. 7).

As described above, due to the flexion deformation caused by a piezoelectric thickness-shear effect in the pair of drive walls Wd, the volume of the ejection channel C1*e*, C2*e* increases. Further, the increase in the capacity of the ejection channel C1*e*, C2*e* results in that the ink 9 retained in the supply-side common flow channel Rin1, Rin2 is induced into the ejection channel C1*e*, C2*e* via the supply slit Sin1, Sin2 (see, e.g., the dotted arrow in FIG. 6).

Subsequently, the ink 9 having been induced into the ejection channel C1*e*, C2*e* in such a manner turns to a pressure wave to propagate to the inside of the ejection channel C1*e*, C2*e*. Then, the drive voltage Vd to be applied to the drive electrodes Ed becomes 0 (zero) V at the timing at which the pressure wave has reached the nozzle hole Hn of the nozzle plate 41 (or timing in the vicinity of that timing). Thus, the drive walls Wd are restored from the state of the flexion deformation described above, and as a result, the capacity of the ejection channel C1*e*, C2*e* having once increased is restored again (see, e.g., the contraction directions db shown in FIG. 7).

In the process in which the volume of the ejection channel C1*e*, C2*e* is restored in such a manner, the internal pressure of the ejection channel C1*e*, C2*e* increases, and the ink 9 in the ejection channel C1*e*, C2*e* is pressurized. As a result, the ink 9 shaped like a droplet is ejected toward the outside (toward the recording paper P or the like) through the nozzle hole Hn (see FIG. 2, and FIG. 5 to FIG. 7). The jet operation (the ejection operation) of the ink 9 in the inkjet head 4 is performed in such a manner, and as a result, the recording operation (the printing operation) of images, characters, and so on to the recording paper P is performed.

It should be noted that some of the ink 9 which fills the insides of the ejection channels C1*e*, C2*e* is recovered into the recovery-side common flow channels Rout1, Rout2 via the recovery slits Sout1, Sout2, respectively (see, e.g., the dotted arrow in FIG. 6). Further, the ink 9 having been recovered into these recovery-side common flow channels Rout1, Rout2 is returned to the inside of the ink tank 3 from the inside of the inkjet head 4 via the ink supply tube 50. In such a manner, the circulation operation of the ink 9 is performed as a result.

(C. Regarding Ejection Failure Due to Bubbles or Foreign Matters)

Incidentally, in the inkjet heads, in general, in order to restore the inkjet head from the ejection failure due to the bubbles or foreign matters such as dirt in the ink which fills the inkjet heads, operations (the flushing operations as the non-printing operation) of ejecting the ink from the nozzle holes are performed besides the printing operation. When performing such a flushing operation, it is arranged that the ejection strength of the ink is increased to increase the pressure variation and oscillation in the ejection channel (an ink chamber) to thereby increase the effectiveness in removing the bubbles and the foreign matters.

However, when the ejection strength on that occasion is too high, the meniscus is broken in the inkjet head. Further, since the meniscus which has once been broken is not restored by itself in the inkjet head of a non-circulation type, even when the drive waveform for performing the printing operation is applied, it is unachievable to eject the ink. In other words, in such a case, the ejection failure due to missing nozzle occurs as a result. Therefore, for example, in the inkjet head of the ink non-circulation type, in general, an additional operation such as an ink refilling operation is required to recover from the ejection failure.

Due to such circumstances, there is desired a proposal of a method which is capable of preventing the ejection failure due to the bubbles, the foreign matters, or the like retained in the ink to improve the ejection reliability of the inkjet head.

(D. Drive Operation and Functions/Advantages of Present Embodiment)

Therefore, in the inkjet head 4 according to the present embodiment, when performing the flushing operation, the drive unit 49 performs the ejection drive based on the second drive signal Sd2 as the drive signal Sd so as to achieve the ejection strength Pj2 higher than the meniscus breaking strength Pmb described above. Specifically, the drive unit 49 performs the ejection drive so as to achieve the ejection strength Pj2 higher than the meniscus breaking strength Pmb using, for example, the methods shown in FIG. 11 described above.

Figure 12:
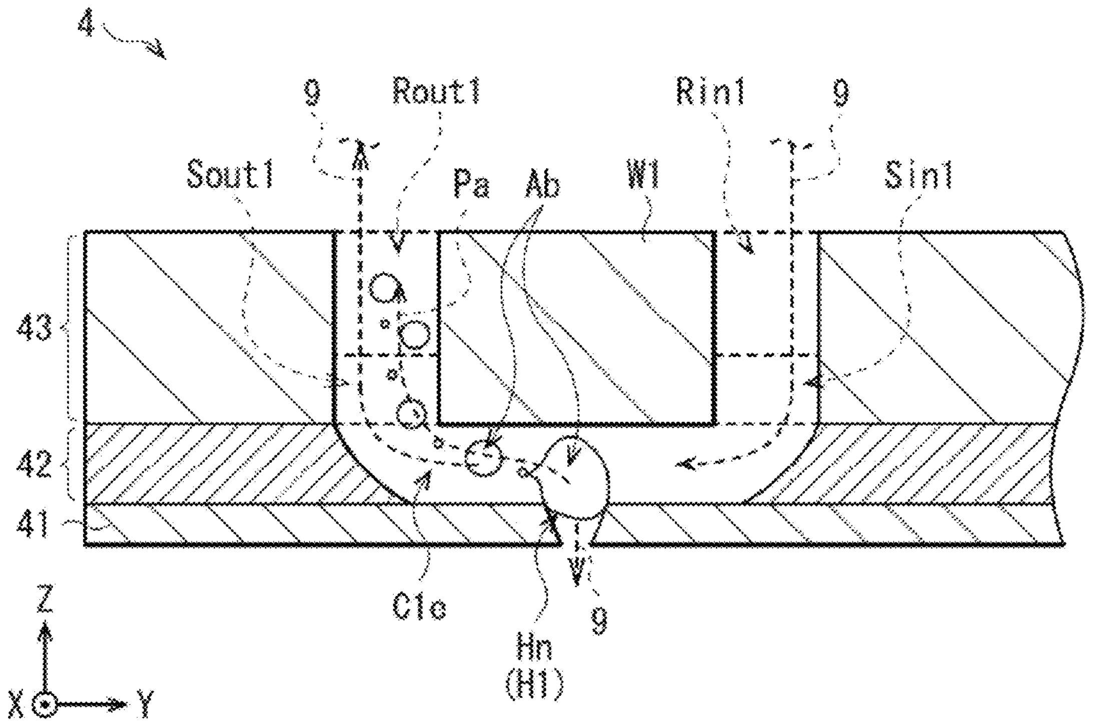
FIG. 12 is a cross-sectional view schematically showing a state example of the liquid jet head when performing the flushing operation.

Here, FIG. 12 is a cross-sectional view (the Y-Z cross-sectional view) schematically showing a state example of the inkjet head 4 when performing such a flushing operation.

As described above, in the present embodiment, by the meniscus in the ejection channels C1*e*, C2*e* being broken when performing the flushing operation, the following is achieved. That is, as indicated by, for example, the dotted arrow Pa in FIG. 12, the bubbles Ab are drawn from the nozzle hole Hn into the ejection channels C1*e*, C2*e* to thereby form the gas-liquid two-phase flow formed of the ink 9 and the bubbles Ab as a result. In the present embodiment, by such a gas-liquid two-phase flow being formed, the pressure variation or oscillation in the ejection channels C1*e*, C2*e*, the fluctuation in a liquid level of the ink 9, and so on increase, and therefore, the effectiveness in removing the bubbles, the foreign matters, and so on retained in the ink 9 is enhanced.

Further, in the present embodiment, as described above, since there is adopted the configuration in which the ink 9 is circulated using the supply-side common flow channels Rin1, Rin2 and the recovery-side common flow channels Rout1, Rout2, the following is achieved. That is, even when the meniscus is broken when performing the flushing operation, the ejection failure due to the missing nozzle or the like is avoided without performing the refilling operation of the ink 9 and so on unlike the case of the configuration in which the ink 9 is not circulated as described above.

Due to the fact described above, in the present embodiment, the ejection failure due to the bubbles Ab, the foreign matters, and so on retained in the ink 9 can effectively be suppressed when performing the printing operation, and as a result, it becomes possible to improve the ejection reliability of the inkjet head 4.

Further, in the present embodiment, it becomes possible to effectively remove the bubbles Ab, the foreign matters, and so on without changing a variety of parameters (back pressure, hydraulic head pressure, and so on) related to the circulation of the ink 9.

Further, in the present embodiment, since the methods (the method A through the method D) shown in FIG. 11 are used as the method of realizing ((the ejection strength Pj2)>(the meniscus breaking strength Pmb)) described above when performing the flushing operation, the following is achieved. That is, it becomes possible to easily control the ejection strength Pj2 using typical ejection parameters (the pulse number Np2 included in the drive period Td, the drive voltage Vd, the drive frequency fd, and the pulse width Wp2 in the pulses p1, p2 included in the second drive signal Sd2).

2. Modified Examples

Then, a modified example of the embodiment described above will be described. It should be noted that the same constituents as those in the embodiment are denoted by the same reference symbols, and the description thereof will be omitted as appropriate.

(Configuration)

Figure 13:
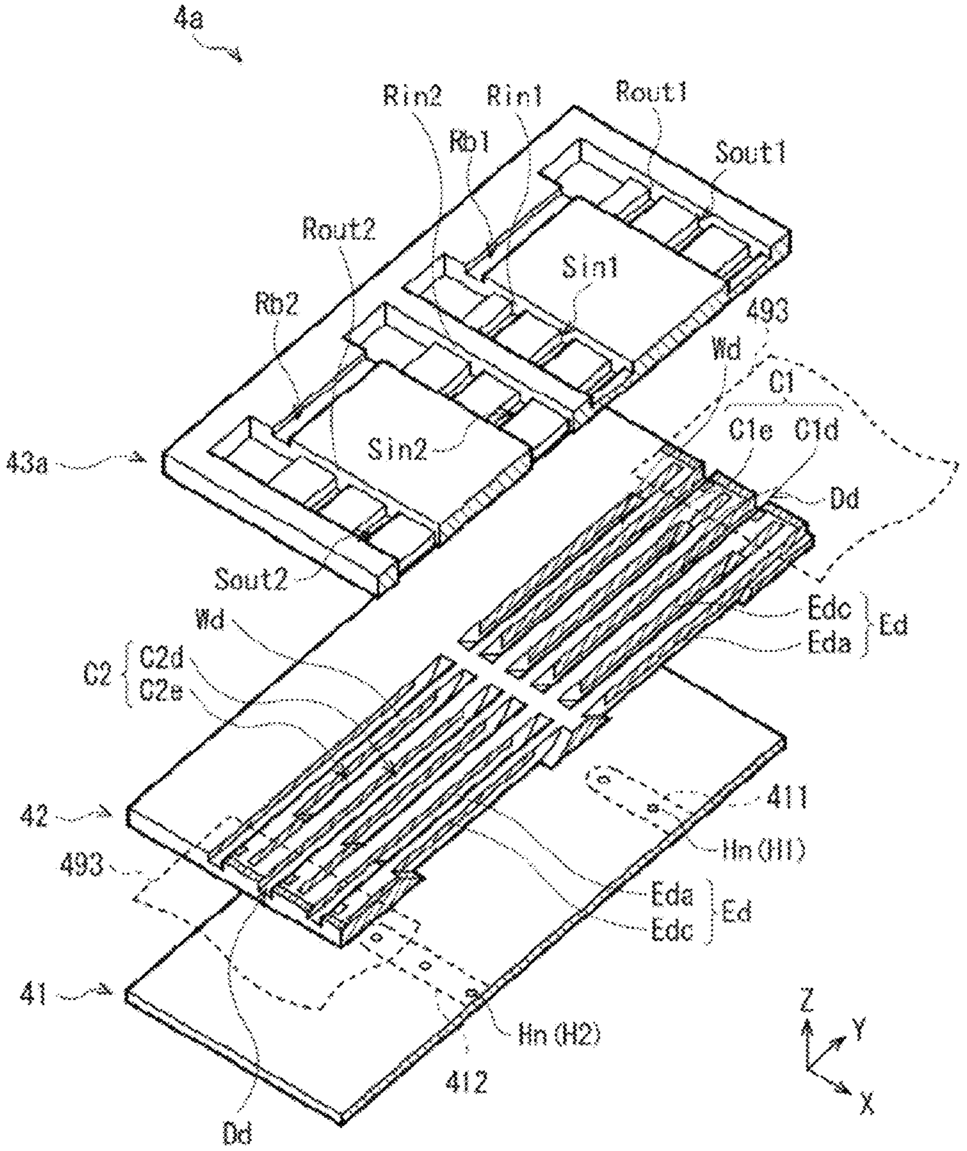
FIG. 13 is an exploded perspective view showing a detailed configuration example of a liquid jet head related to a modified example.

FIG. 13 is an exploded perspective view showing a detailed configuration example of an inkjet head 4*a* related to the modified example. Further, FIG. 14 is a diagram schematically showing a cross-sectional configuration example (a Y-Z cross-sectional configuration example) of the inkjet head 4*a* shown in FIG. 13.

Figure 14:
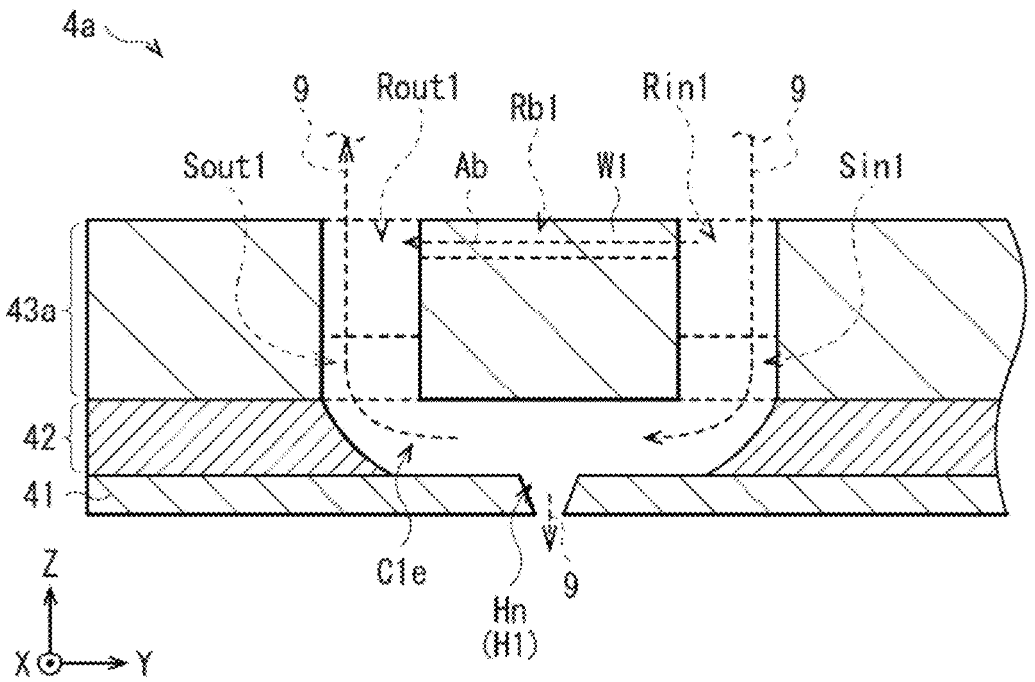
FIG. 14 is a schematic diagram showing a cross-sectional configuration example of the liquid jet head shown in FIG. 13.

As shown in FIG. 13 and FIG. 14, the inkjet head 4*a* according to the modified example corresponds to what is obtained by providing a cover plate 43*a* described hereinafter instead of the cover plate 43 in the inkjet head 4 according to the embodiment, and the rest of the configuration is made substantially the same.

It should be noted that the inkjet head 4*a* corresponds to a specific example of a "liquid jet head" in the present disclosure, and the printer provided with the inkjet head 4*a* corresponds to a specific example of a "liquid jet recording apparatus" according to the present disclosure. Further, the nozzle plate 41, the actuator plate 42, and the cover plate 43*a* correspond to a specific example of a "jet unit" in the present disclosure.

The cover plate 43*a* in the modified example corresponds to what is obtained by further providing bypass flow channels Rb1, Rb2 described hereinafter in the cover plate 43 in the embodiment, and the rest of the configuration is made substantially the same.

As shown in FIG. 13 and FIG. 14, the bypass flow channel Rb1 is a flow channel for communicating the supply-side common flow channel Rin1 and the recovery-side common flow channel Rout1 with each other. Similarly, as shown in FIG. 13, the bypass flow channel Rb2 is a flow channel for communicating the supply-side common flow channel Rin2 and the recovery-side common flow channel Rout2 with each other. Such bypass flow channels Rb1 are respectively disposed in the vicinity of both ends along the extending direction (the X-axis direction) of the supply-side common flow channel Rin1 and the recovery-side common flow channel Rout1 (see FIG. 13). Such bypass flow channels Rb2 are respectively disposed in the vicinity of both ends along the extending direction (the X-axis direction) of the supply-side common flow channel Rin2 and the recovery-side common flow channel Rout2 (see FIG. 13).

Functions/Advantages

In the modified example having such a configuration, the following functions and advantages, for example, are obtained in addition to the functions and advantages in the embodiment.

That is, in the inkjet head 4*a* according to the modified example, since the bypass flow channels Rb1, Rb2 described above are disposed, it becomes possible for the bubbles Ab having been drawn into the ejection channels C1*e*, C2*e* when performing the flushing operation to pass through these bypass flow channels Rb1, Rb2 (see, e.g., the dotted arrow in FIG. 14). Therefore, the possibility that the bubbles Ab having been drawn into the ejection channels C1*e*, C2*e* enter other ejection channels C1*e*, C2*e* via, for example, the supply-side common flow channels Rin1, Rin2 becomes apt to be avoided. Thus, the ejection failure due to the bubbles Ab, the foreign matters, and so on retained in the ink 9 can further effectively be suppressed, and as a result, it becomes possible to further improve the ejection reliability of the inkjet head 4*a*.

3. Other Modified Examples

The present disclosure is described hereinabove citing the embodiment and the modified example, but the present disclosure is not limited to the embodiment and so on, and a variety of modifications can be adopted.

For example, in the embodiment and so on described above, the description is presented specifically citing the configuration examples (the shapes, the arrangements, the number and so on) of each of the members in the printer and the inkjet head, but those described in the above embodiment and so on are not limitations, and it is possible to adopt other shapes, arrangements, numbers and so on. Further, the values or the ranges, the magnitude relation and so on of a variety of parameters described in the above embodiment and so on are not limited to those described in the above embodiment and so on, but can also be other values or ranges, other magnitude relation and so on.

Specifically, for example, although in the embodiment and so on described above, the examples of the types and the number of the pulses included in the drive signal Sd, the levels of the drive voltage Vd and the drive frequency fd, the setting value of the pulse width, and so on are specifically cited and described, those explained in the embodiment and so on described above are not limitations.

Further, a variety of types of structures can be adopted as the structure of the inkjet head. In other words, for example, in the embodiment and so on described above, the description is presented citing as an example a so-called side-shoot type inkjet head for ejecting the ink 9 from a central part in the extending direction of each of the ejection channels in the actuator plate. It should be noted that this example is not a limitation, and for example, it is possible to adopt a so-called edge-shoot type inkjet head for ejecting the ink 9 along the extending direction of each of the ejection channels.

Further, the type of the printer is not limited to the type described in the embodiments and so on described above, and it is possible to apply a variety of types such as a MEMS (Micro Electro-Mechanical Systems) type.

In addition, although in the embodiment and so on described above, the method of realizing ((the ejection strength Pj2)> (the meniscus breaking strength Pmb)) when performing the flushing operation is described citing some specific examples, the methods cited in the embodiment and so on described above are not a limitation, and it is possible to use other methods. Further, for example, it is possible to arrange that two or more of the methods cited in the embodiment and so on are used in combination as appropriate.

Further, the series of processing described in the above embodiments and so on can be arranged to be performed by hardware (a circuit), or can also be arranged to be performed by software (a program). When arranging that the series of processing is performed by the software, the software is constituted by a program group for making the computer perform the functions. The programs can be incorporated in advance in the computer described above to be used by the computer, for example, or can also be installed in the computer described above from a network or a recording medium to be used by the computer.

Further, in the embodiment and so on described above, the description is presented citing the printer 1 (the inkjet printer) as a specific example of the "liquid jet recording apparatus" in the present disclosure, but this example is not a limitation, and it is also possible to apply the present disclosure to other apparatuses than the inkjet printer. In other words, it is also possible to arrange that the "liquid jet head" (the inkjet head) of the present disclosure is applied to other apparatuses than the inkjet printer. Specifically, it is also possible to arrange that the "liquid jet head" of the present disclosure is applied to an apparatus such as a facsimile or an on-demand printer.

In addition, it is also possible to apply the variety of examples described hereinabove in arbitrary combination.

It should be noted that the advantages described in the present specification are illustrative only, but are not a limitation, and other advantages can also be provided. Further, the present disclosure can also take the following configurations.

(1) A liquid jet head including a jet unit including a plurality of nozzles configured to jet a liquid, a plurality of pressure chambers which is individually communicated with the plurality of nozzles, and which is filled with the liquid, a liquid supply chamber configured to supply the liquid to insides of the pressure chambers, and a liquid recovery chamber configured to recover the liquid from the insides of the pressure chambers, and a drive unit configured to drive the jet unit based on a drive signal to jet the liquid which fills the inside of the pressure chamber from the nozzle, wherein the drive unit is configured to drive the jet unit based on a first drive signal as the drive signal when performing a printing operation on a recording target medium so as to achieve ejection strength lower than meniscus breaking strength of breaking a meniscus in the jet unit, and drive the jet unit based on a second drive signal as the drive signal when performing a flushing operation as a non-printing operation of performing dummy ejection of the liquid from the nozzle so as to achieve the ejection strength higher than the meniscus breaking strength.

(2) The liquid jet head described in (1), wherein the drive unit is configured to increase a drive voltage in the second drive signal to a value higher than a first threshold value corresponding to the meniscus breaking strength to thereby set the ejection strength to be higher than the meniscus breaking strength.

(3) The liquid jet head described in one of (1) and (2), wherein the drive unit is configured to increase a drive frequency in the second drive signal to a value higher than a second threshold value corresponding to the meniscus breaking strength to thereby set the ejection strength to be higher than the meniscus breaking strength.

(4) The liquid jet head described in any one of (1) through (3), wherein the drive unit is configured to increase a number of pulses included in one cycle in the second drive signal to a value higher than a third threshold value corresponding to the meniscus breaking strength to thereby set the ejection strength to be higher than the meniscus breaking strength.

(5) The liquid jet head described in any one of (1) through (4), wherein the drive unit is configured to set a pulse width in a pulse included in the second drive signal to a resonance period (AP) to thereby set the ejection strength to be higher than the meniscus breaking strength.

(6) The liquid jet head described in any one of (1) through (5), wherein the jet unit further includes a bypass flow channel configured to communicate the liquid supply chamber and the liquid recovery chamber with each other.

(7) A liquid jet recording apparatus including the liquid jet head described in any one of (1) through (6).

(8) A method of controlling a liquid jet head provided with a jet unit including a plurality of nozzles configured to jet a liquid, a plurality of pressure chambers which is individually communicated with the plurality of nozzles, and which is filled with the liquid, a liquid supply chamber configured to supply the liquid to insides of the pressure chambers, and a liquid recovery chamber configured to recover the liquid from the insides of the pressure chambers, the method including driving the jet unit based on a drive signal to jet the liquid which fills the inside of the pressure chamber from the nozzle, wherein the jetting the liquid from the nozzle includes driving the jet unit based on a first drive signal as the drive signal when performing a printing operation on a recording target medium so as to achieve ejection strength lower than meniscus breaking strength of breaking a meniscus in the jet unit, and driving the jet unit based on a second drive signal as the drive signal when performing a flushing operation as a non-printing operation of performing dummy ejection of the liquid from the nozzle so as to achieve the ejection strength higher than the meniscus breaking strength.

What is claimed is:

1. A liquid jet head comprising:

a jet unit including a plurality of nozzles configured to jet a liquid, a plurality of pressure chambers which is individually communicated with the plurality of nozzles, and which is filled with the liquid, a liquid supply chamber configured to supply the liquid to insides of the pressure chambers, and a liquid recovery chamber configured to recover the liquid from the insides of the pressure chambers; and a drive unit configured to drive the jet unit based on a drive signal to jet the liquid which fills the inside of the pressure chamber from the nozzle, wherein the drive unit is configured to drive the jet unit based on a first drive signal as the drive signal when performing a printing operation on a recording target medium so as to achieve ejection strength lower than meniscus breaking strength of breaking a meniscus in the jet unit, and drive the jet unit based on a second drive signal as the drive signal when performing a flushing operation as a non-printing operation of performing dummy ejection of the liquid from the nozzle so as to achieve the ejection strength higher than the meniscus breaking strength.

2. The liquid jet head according to claim 1, wherein the drive unit is configured to increase a drive voltage in the second drive signal to a value higher than a first threshold value corresponding to the meniscus breaking strength to thereby set the ejection strength to be higher than the meniscus breaking strength.

3. The liquid jet head according to claim 1, wherein the drive unit is configured to increase a drive frequency in the second drive signal to a value higher than a second threshold value corresponding to the meniscus breaking strength to thereby set the ejection strength to be higher than the meniscus breaking strength.

4. The liquid jet head according to claim 1, wherein the drive unit is configured to increase a number of pulses included in one cycle in the second drive signal to a value higher than a third threshold value corresponding to the meniscus breaking strength to thereby set the ejection strength to be higher than the meniscus breaking strength.

5. The liquid jet head according to claim 1, wherein the drive unit is configured to set a pulse width in a pulse included in the second drive signal to a resonance period (AP) to thereby set the ejection strength to be higher than the meniscus breaking strength.

6. The liquid jet head according to claim 1, wherein the jet unit further includes a bypass flow channel configured to communicate the liquid supply chamber and the liquid recovery chamber with each other.

7. A liquid jet recording apparatus comprising:

the liquid jet head according to claim 1.

8. A method of controlling a liquid jet head provided with a jet unit including a plurality of nozzles configured to jet a liquid, a plurality of pressure chambers which is individually communicated with the plurality of nozzles, and which is filled with the liquid, a liquid supply chamber configured to supply the liquid to insides of the pressure chambers, and a liquid recovery chamber configured to recover the liquid from the insides of the pressure chambers, the method comprising:

jetting the liquid which fills the inside of the pressure chamber from the nozzle by driving the jet unit based on a drive signal, wherein the jetting the liquid from the nozzle includes driving the jet unit based on a first drive signal as the drive signal when performing a printing operation on a recording target medium so as to achieve ejection strength lower than meniscus breaking strength of breaking a meniscus in the jet unit, and driving the jet unit based on a second drive signal as the drive signal when performing a flushing operation as a non-printing operation of performing dummy ejection of the liquid from the nozzle so as to achieve the ejection strength higher than the meniscus breaking strength.

* * * * *